(12) United States Patent
Sugiura et al.

(10) Patent No.: US 9,336,368 B2
(45) Date of Patent: *May 10, 2016

(54) LICENSE INSTALL SUPPORT SYSTEM, LICENSE INSTALL SUPPORT METHOD

(71) Applicant: RICOH COMPANY, LTD., Tokyo (JP)

(72) Inventors: Yuuko Sugiura, Tokyo (JP); Tomoya Hirokawa, Kanagawa (JP); Xiaofeng Han, Kanagawa (JP); Taku Ikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/479,467

(22) Filed: Sep. 8, 2014

(65) Prior Publication Data
US 2014/0380502 A1    Dec. 25, 2014

Related U.S. Application Data

(63) Continuation of application No. 13/821,694, filed as application No. PCT/JP2011/070912 on Sep. 7, 2011, now Pat. No. 8,863,300.

(30) Foreign Application Priority Data

Sep. 16, 2010  (JP) ................................ 2010-208582

(51) Int. Cl.
*G06F 21/10* (2013.01)
(52) U.S. Cl.
CPC .................................... *G06F 21/105* (2013.01)
(58) Field of Classification Search
USPC .......................................................... 726/26
See application file for complete search history.

(56) References Cited

U.S. PATENT DOCUMENTS 5,905,860 A * 5/1999 Olsen .................... G06F 21/121
                                                                705/59
8,620,818 B2    12/2013  Hughes et al.
(Continued)

FOREIGN PATENT DOCUMENTS

JP          2001-236219         8/2001
JP          2007-199858         8/2007
(Continued)

OTHER PUBLICATIONS

Korean Office Action dated Oct. 15, 2014.
(Continued)

*Primary Examiner* — Tu Nguyen
(74) *Attorney, Agent, or Firm* — IPUSA, PLLC

(57) ABSTRACT

A license install support method includes receiving input of a first license identifier used for receiving license data, the license data being used by an electronic device for determining whether activation of a program is allowable; sending, to a license source determining device connected via a network, an acquisition request specifying the first license identifier for acquiring issuing source information including issuing source identification information of the license data; receiving the issuing source information returned from the license source determining device; and using a license install processing unit to acquire the license data corresponding to the first license identifier from a license management device relevant to the issuing source information included among plural license management devices connected via the network, and to send the license data to the electronic device.

10 Claims, 13 Drawing Sheets

(56) References Cited

U.S. PATENT DOCUMENTS

| | | | |
|---|---|---|---|
| 8,818,900 B2 | 8/2014 | Koka et al. | |
| 2004/0039916 A1* | 2/2004 | Aldis | G06F 21/10 713/177 |
| 2006/0200420 A1 | 9/2006 | Osada | |
| 2007/0033395 A1 | 2/2007 | MacLean | |
| 2007/0174205 A1 | 7/2007 | Saito | |
| 2008/0065551 A1 | 3/2008 | Niakan et al. | |
| 2008/0209569 A1 | 8/2008 | Araki | |
| 2010/0058482 A1 | 3/2010 | Nagumo et al. | |
| 2010/0071069 A1 | 3/2010 | Sugiura et al. | |
| 2011/0041125 A1 | 2/2011 | Sugiura | |
| 2011/0055825 A1 | 3/2011 | Ikawa | |
| 2011/0066886 A1 | 3/2011 | Sugiura et al. | |
| 2011/0066972 A1 | 3/2011 | Sugiura | |
| 2011/0067117 A1 | 3/2011 | Nagumo et al. | |

FOREIGN PATENT DOCUMENTS

| | | |
|---|---|---|
| JP | 2008-243179 | 10/2008 |
| JP | 2011-039875 | 2/2011 |
| JP | 2011-060144 | 3/2011 |
| JP | 2011-060237 | 3/2011 |
| KR | 10-0602107 | 7/2006 |
| WO | 20031096136 | 11/2003 |
| WO | 20061116159 | 11/2006 |
| WO | 20071016624 | 2/2007 |
| WO | 20081030688 | 3/2008 |

OTHER PUBLICATIONS

International Search Report Issued Oct. 25, 2011 in PCT/JP2011/070912 Filed on Sep. 7, 2011.
Extended European search report dated Jan. 8, 2014.
Takumi Terabayashi, Younosuke Furui and Haruo Hayami, "A proposal of application license management technique using non-contact type IC chip", IPSJ SIG Technical Report, Japan, Information Processing Society of Japan, Mar. 18, 2005, vol. 2005, No. 30, p. 93-98 (With English Abstract).
Japanese Office Action dated Jul. 8, 2014.

* cited by examiner

FIG.5

| INPUT PRODUCT KEY | MODEL INFORMATION | ISSUING-SOURCE-USE PRODUCT KEY | ISSUING SOURCE URL |
|---|---|---|---|
| 1111111111 | A | 1111111111 | http://*******/aaaaaaaaa |
| 1111111111 | B | aaaaccccc5 | http://*******/bbbbbbbbb |
| 1111111112 | C | ccccccccc2 | http://*******/ccccccccc |
| 1111111113 | A | 1111111113 | http://*******/aaaaaaaaa |
| 1111111114 | C | ccccccccc2 | http://*******/ccccccccc |
| 1111111115 | B | bbbbbbbbb2 | http://*******/bbbbbbbbb |
| 1111111116 | A | 1111111116 | http://*******/aaaaaaaaa |

| ISSUING SOURCE URL | LICENSE INSTALL PROCESSING UNIT |
|---|---|
| http://******/aaaaaaaaaa | A |
| http://******/bbbbbbbbb | B |
| http://******/ccccccccc | C |

FIG.10

| COMPONENT ID | COMPONENT ID OF DEPENDENCY DESTINATION |
|---|---|
| 21111111 | 0 |
| 21111112 | 21111111 |
| 21111113 | 0 |
| 21111114 | 21111111 |
| : | : |

| COMPONENT ID |
|---|
| MACHINE NUMBER |
| EXPIRATION DATE |

FIG.12

| MANAGEMENT NUMBER | PRODUCT KEY | COMPONENT ID | MACHINE NUMBER | STATUS | LICENSE FORMAT | LICENSE EFFECTIVE PERIOD | LICENSE EXPIRATION DATE | LICENSE ISSUE DATE |
|---|---|---|---|---|---|---|---|---|
| 1 | KEY001 | PR0xxx001 | K00001 | CHECK OUT | TIME-LIMITED LICENSE (SPECIFY PERIOD) | 1 YEAR | | |
| 2 | KEY001 | PR0xxx001 | K00002 | CHECK OUT | TIME-LIMITED LICENSE (SPECIFY PERIOD) | 1 YEAR | | |
| 3 | KEY001 | PR0xxx001 | | CHECK IN | TIME-LIMITED LICENSE (SPECIFY PERIOD) | 1 YEAR | | |
| 4 | KEY003 | PR0xxx004 | K00004 | CHECK OUT | | | | |

| COMPONENT ID | VERSION | ACTIVATION FLAG | LICENSE EXPIRATION DATE |
|---|---|---|---|
| ... | ... | ACTIVATED | 2009.1.30 |
| ... | ... | NOT ACTIVATED | UNLIMITED |
| ... | ... | ... | ... |

23

LICENSE INSTALL SUPPORT SYSTEM, LICENSE INSTALL SUPPORT METHOD

CROSS-REFERENCES TO RELATED APPLICATIONS

This application is a continuation application of and is claiming benefit of priority under 35 U.S.C. 120 to the patent application Ser. No. 13/821,694 filed on Mar. 8, 2013, which has effectively entered under 35 U.S.C. 371 (c) the national stage from the PCT Application No. PCT/JP2011/070912 filed on Sep. 7, 2011, which claims the benefit of priorities of Japanese Patent Application No. 2010-208582 filed on Sep. 16, 2010 with the Japan Patent Office, where the entire contents of all applications which are incorporated herein by reference.

TECHNICAL FIELD

The present invention relates to a license install support system and a license install support method, and more particularly to a license install support system and a license install support method for supporting the process of installing a program in an electronic device.

BACKGROUND ART

In recent years, there have been image forming apparatuses referred to as multifunction peripherals in which applications can be installed after shipment. If a license for using such an application can be provided in accordance with the user's usage format, separately from the entity of the application, the following advantages can be achieved. That is, not only is it convenient for the user, the vendor who sells the application can expect increased business opportunities.

However, in a user environment using multiple image forming apparatuses, it is considerably troublesome to install licenses in the respective image forming apparatuses. Thus, patent document 1 discloses a technology for collectively installing a license of an application in plural image forming apparatuses.

In patent document 1, it is assumed that the issuing source of the license is a single source or a common source. Thus, inventors of the present invention have considered establishing a flexible system, in which licenses may be issued by different sources according to the applications. If licenses may be issued by different sources according to the applications, the issuing source of a license may be easily changed, starting from a model of the image forming apparatus of a certain time point.

However, it is highly likely that the procedure for acquiring a license may differ according to the issuing source of the license. For example, it is highly likely that the communication protocols are different, or the parameters required for acquiring the licenses may be different.

Accordingly, a client program may be required according to the license issuing source. Thus, the user who is acquiring licenses of applications needs to use different client programs depending on the issuing sources of the licenses. This is quite a burden on the user, which may have adverse effects on sales promotions of applications.

Patent Document 1: Japanese Laid-Open Patent Publication No. 2008-243179

DISCLOSURE OF INVENTION

The present invention has been made in view of the above-described problems, and it is an object of at least one embodiment of the present invention to provide a license install support system and a license install support method, which are capable of appropriately mitigating the workload of installing licenses, even when there are plural license issuing sources.

An aspect of the present invention provides a license install support system including a license install support device; and a license source determining device, wherein the license install support device includes a receiving unit configured to receive input of a first license identifier used for receiving license data, the license data being used by an electronic device for determining whether activation of a program is allowable, an issuing source information acquiring unit configured to send, to the license source determining device connected via a network, an acquisition request specifying the first license identifier for acquiring issuing source information including issuing source identification information of the license data, and to receive the issuing source information returned from the license source determining device, and a license install processing unit configured to acquire the license data corresponding to the first license identifier from a license management device relevant to the issuing source information included among plural license management devices connected via the network, and to send the license data to the electronic device, wherein the license source determining device includes an issuing source information storing unit configured to store association information indicating association between the first license identifier and the issuing source information, and an issuing source information providing unit configured to acquire, with the use of the issuing source information storing unit, the issuing source information corresponding to the first license identifier specified in the acquisition request in response to receiving the acquisition request from the issuing source information acquiring unit, and to return the issuing source information.

An aspect of the present invention provides a license install support method including receiving input of a first license identifier used for receiving license data, the license data being used by an electronic device for determining whether activation of a program is allowable; sending, to a license source determining device connected via a network, an acquisition request specifying the first license identifier for acquiring issuing source information including issuing source identification information of the license data; receiving the issuing source information returned from the license source determining device; and using a license install processing unit to acquire the license data corresponding to the first license identifier from a license management device relevant to the issuing source information included among plural license management devices connected via the network, and to send the license data to the electronic device.

An aspect of the present invention provides a non-transitory computer-readable storage medium with an executable license install support program stored therein, wherein the license install support program instructs a processor of a computer to execute receiving input of a first license identifier used for receiving license data, the license data being used by an electronic device for determining whether activation of a program is allowable; sending, to a license source determining device connected via a network, an acquisition request specifying the first license identifier for acquiring issuing source information including issuing source identification information of the license data; receiving the issuing source information returned from the license source determining device; and using a license install processing unit to acquire the license data corresponding to the first license identifier from a license management device relevant to the issuing source information included among plural license management devices connected via the network, and to send the license data to the electronic device.

BRIEF DESCRIPTION OF DRAWINGS

FIG. 5 illustrates a configuration example of an issuing source information storing unit;

FIG. 6 illustrates a configuration example of a selection information storage unit;

FIG. 10 illustrates a configuration example of a dependency relationship management table;

FIG. 11 illustrates a configuration example of a license file;

FIG. 12 illustrates a configuration example of a license management table;

FIG. 13 illustrates a configuration example of an install information management table.

BEST MODE FOR CARRYING OUT THE INVENTION

Figure 1:
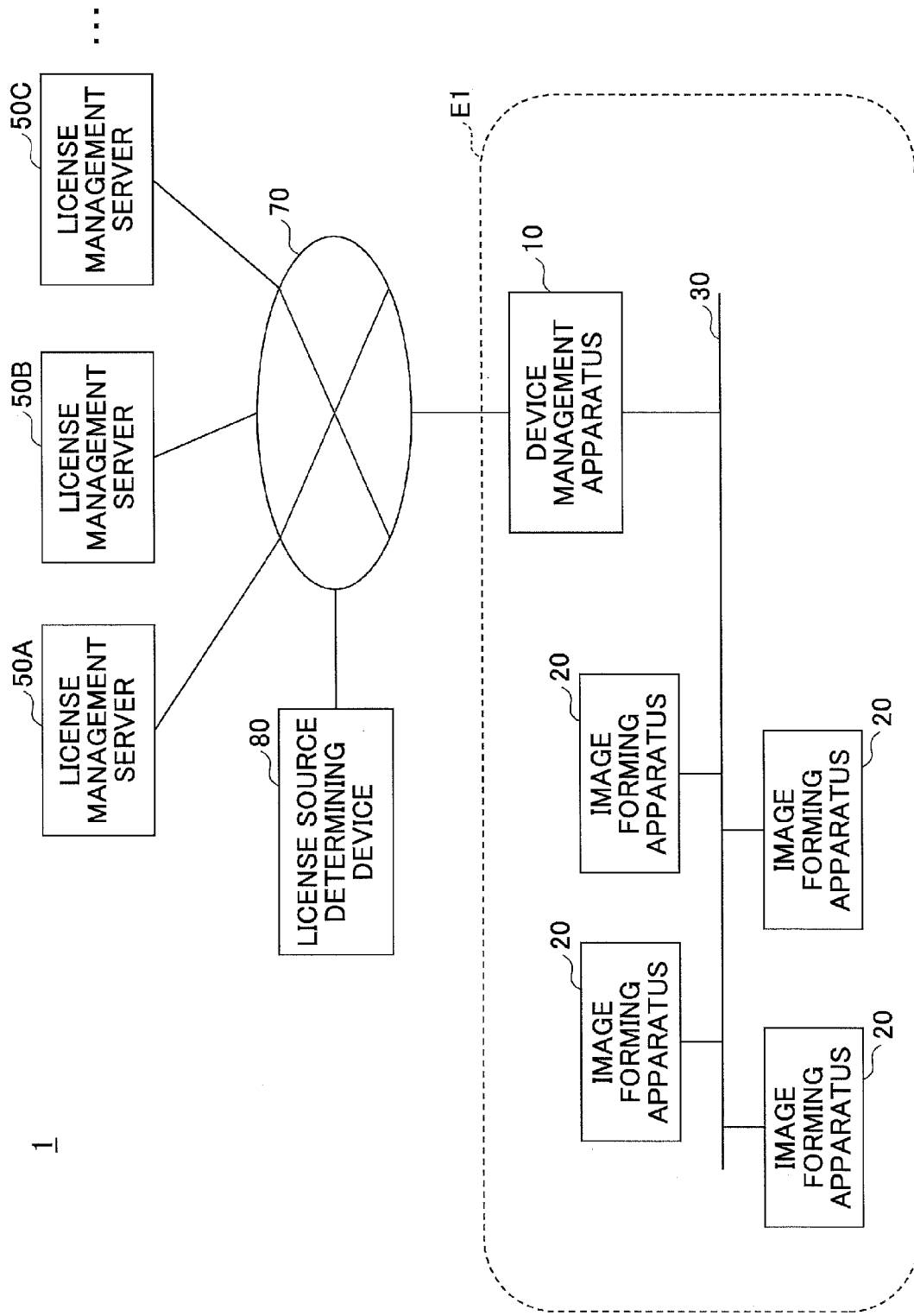
FIG. 1 illustrates a system configuration example of a license install support system according to a first embodiment.

Embodiments of the present invention are described below with reference to the accompanying drawings. FIG. 1 illustrates a system configuration example of a license install support system according to a first embodiment. In a license install support system 1 shown in FIG. 1, a user environment E1 is a system environment of the user of image forming apparatuses 20. For example, the user environment E1 is the company or office corresponding to the user of the image forming apparatuses 20.

In the user environment E1, one or more image forming apparatuses 20 and a device management apparatus 10 are interconnected via a network 30 (wired or wireless) such as a LAN (Local Area Network). The image forming apparatuses 20 are multifunction peripherals for implementing plural functions such as printing, scanning, copying, and fax transmission/reception in a single body, which is an example of an electronic device. The image forming apparatuses 20 can expand the functions according to need, by adding or updating program components (hereinafter, simply referred to as "components").

The device management apparatus 10 is a computer such as a PC (Personal Computer), which collectively acquires and installs components that operate in the image forming apparatuses 20 in the user environment E1 as well as licenses (usage rights) of the components. In the present embodiment, the device management apparatus 10 is an example of a license install support device. There may be plural user environments E1 according to the number of users (users in units of companies or offices).

The device management apparatus 10 is connected to license management servers 50A, 50B, and 50C, and a license source determining device 80, via a network 70 such as a LAN (Local Area Network) or the Internet.

The license management servers 50A, 50B, and 50C (hereinafter, collectively referred to as the "license management server 50" when no distinctions are made) are computers functioning as issuing sources of licenses for components purchased by the user. In FIG. 1, there are three license management servers 50; however the number of license management servers 50 may be two or four or more. The plural license management servers 50 are not provided for the purpose of distributing the processing load. Rather, the respective license management servers 50 are provided for implementing different methods of managing licenses (license management method). A license management method is a concept for specifying the format of data (referred to as a license file below) indicating a license. Furthermore, a license management method also specifies the data format of the license identifier that is required for issuing a license.

A license identifier is data for identifying a license that is distributed to a user who purchased the license of a component. A license identifier is issued each time a license is purchased. Therefore, even when there are two licenses that correspond to the same component and that have the same license contents, the license identifiers of these two licenses are different. The respective license management servers 50 manage license contents and usage statuses of licenses (issued or not issued), in association with license identifiers. Accordingly, the usage of components beyond the scope of the purchased license is appropriately limited. In the following, a license identifier is referred to as a "product key", as a matter of convenience. The operation of distributing a product key when a license is purchased, and the operation of managing the license contents and the usage status of licenses in association with product keys are common to all license issuing sources (license management servers 50). However, the format of the product key may differ according to the license management server 50.

The respective license management servers 50 may be administered by the same administration entity or by different administration entities.

The license source determining device 80 is a computer for determining which license management server 50 is the issuing source of the license corresponding to a product key specified in an inquiry asking the license issuing source, in response to receiving the inquiry transmitted from the device management apparatus 10.

Figure 2:
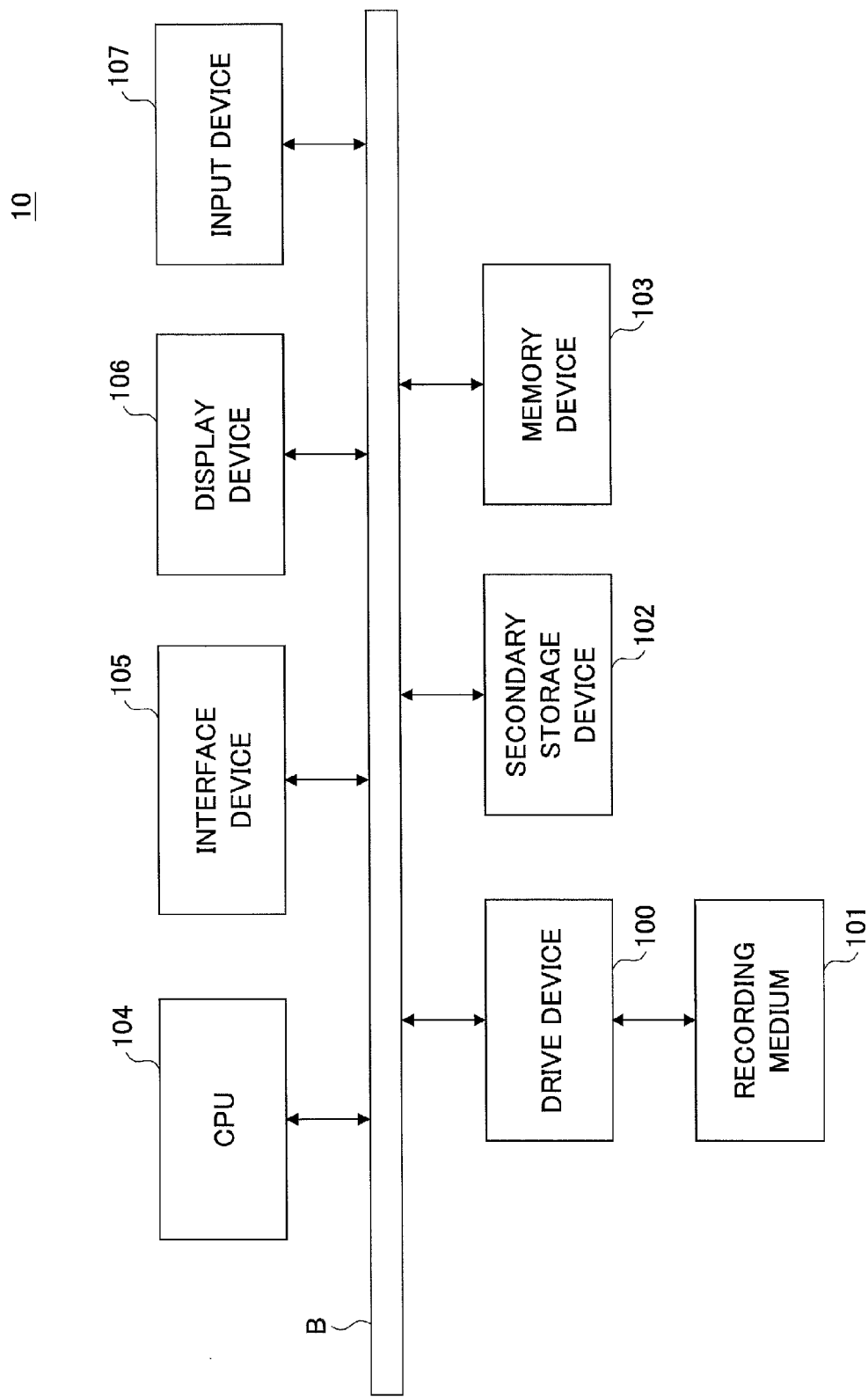
FIG. 2 illustrates an example of a hardware configuration of a device management apparatus according to an embodiment of the present invention.

FIG. 2 illustrates an example of a hardware configuration of the device management apparatus 10 according to an embodiment of the present invention. As shown in FIG. 2, the device management apparatus 10 includes a drive device 100, a secondary storage device 102, a memory device 103, a CPU 104, an interface device 105, a display device 106, and an input device 107, which are interconnected by a bus B.

A program for implementing a process performed by the device management apparatus 10 is provided by a recording medium 101 such as a CD-ROM. When the recording medium 101 recording the program is set in the drive device 100, the program is installed in the secondary storage device 102 from the recording medium 101 via the drive device 100. However, the program need not be installed from the recording medium 101; the program may be downloaded from another computer via the network. The secondary storage device 102 stores the installed programs as well as necessary files and data.

The memory device 103 reads a program from the secondary storage device 102 and stores the program, when an instruction to activate the program is given. The CPU 104 implements functions relevant to the device management apparatus 10, in accordance with the program stored in the memory device 103. The interface device 105 is used as an interface for connecting to a network. The display device 106 is for displaying a GUI (Graphical User Interface) according to the program. The input device 107 is configured with a keyboard and a mouse, and is used for inputting various operation instructions.

The respective license management servers 50 and the license source determining device 80 may have the same hardware configuration as that of FIG. 2. However, the respective license management servers 50 and the license source determining device 80 may not include the display device 106 and the input device 107.

Figure 3:
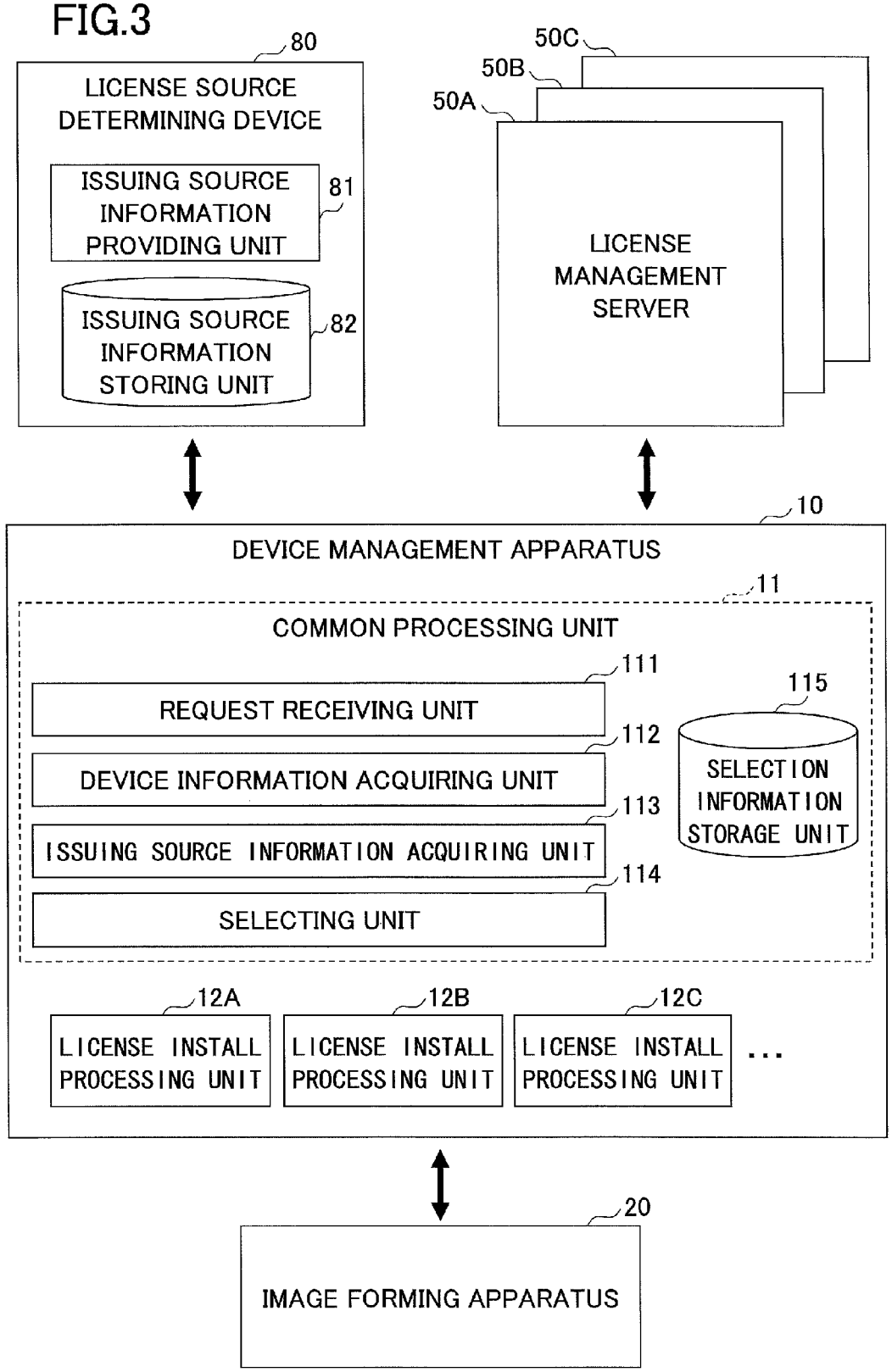
FIG. 3 illustrates an example of a function configuration of the license install support system according to the first embodiment.

FIG. 3 illustrates an example of a function configuration of the license install support system 1 according to the first embodiment. As shown in FIG. 3, the device management apparatus 10 includes a common processing unit 11, a license install processing unit 12A, a license install processing unit 12B, and a license install processing unit 12C (hereinafter, collectively referred to as the "license install processing unit 12" when no distinctions are made). These units are implemented when a program installed in the device management apparatus 10 causes the CPU 104 to execute a process.

The common processing unit 11 executes necessary processes that are common to all license issuing sources. As shown in FIG. 3, the common processing unit 11 includes a request receiving unit 111, a device information acquiring unit 112, an issuing source information acquiring unit 113, a selecting unit 114, and a selection information storage unit 115.

The request receiving unit 111 receives a request to install a license in the image forming apparatus 20. In the request to install the license, a product key and the image forming apparatus 20 that is the install destination are specified. The device information acquiring unit 112 acquires device information from the image forming apparatus 20. The device information includes model information indicating the model of the image forming apparatus 20 and information relevant to components installed in the image forming apparatus 20. The issuing source information acquiring unit 113 acquires, from the license source determining device 80, information relevant to the issuing source of the license corresponding to the product key input by the user (hereinafter, "issuing source information"). The selecting unit 114 selects the license install processing unit 12 corresponding to the issuing source information, and instructs the selected license install processing unit 12 to execute a process. The selection information storage unit 115 stores information used by the selecting unit 114 for determining the license install processing unit 12 corresponding to the issuing source information, with the use of the secondary storage device 102, for example. More specifically, the selection information storage unit 115 stores association information indicating the association between the issuing source information and the license install processing unit 12.

Each license install processing unit 12 executes a process of acquiring a license from the license management server 50 to which the license install processing unit 12 corresponds, in response to an instruction from the selecting unit 114. Furthermore, the license install processing unit 12 executes a process of installing a license in the image forming apparatuses 20 that is specified as the license install destination.

In the present embodiment, the respective license install processing units 12 correspond to the license management servers 50 having the same alphabetical letter (A, B, or C) accompanying their reference numerals. One license install processing unit 12 is provided for each license management server 50, because the license management servers 50 perform different processing procedures by different communication protocols to acquire licenses. Furthermore, the processing procedures and communication protocols for installing licenses in the image forming apparatus 20 may differ depending on the license management server 50 by which the license is issued. In the present embodiment, a file for storing data in which a license is embodied (license data) is referred to as a license file.

The license source determining device 80 includes an issuing source information providing unit 81 and an issuing source information storing unit 82. When a request to acquire issuing source information transmitted by the issuing source information acquiring unit 113 is received, the issuing source information providing unit 81 returns issuing source information relevant to a product key specified in the acquiring request. The issuing source information storing unit 82 stores association information indicating the association between the product key and the issuing source information.

The image forming apparatuses 20 may perform different license management methods according to the type of model. Therefore, the respective image forming apparatuses 20 receive requests to install license files from the device management apparatus 10, by processing procedures and communication protocols in accordance with license management methods corresponding to themselves. Furthermore, the respective image forming apparatuses 20 determine whether to allow components to be activated in themselves based on the license files, by processing procedures in accordance with license management methods corresponding to themselves.

Figure 4:
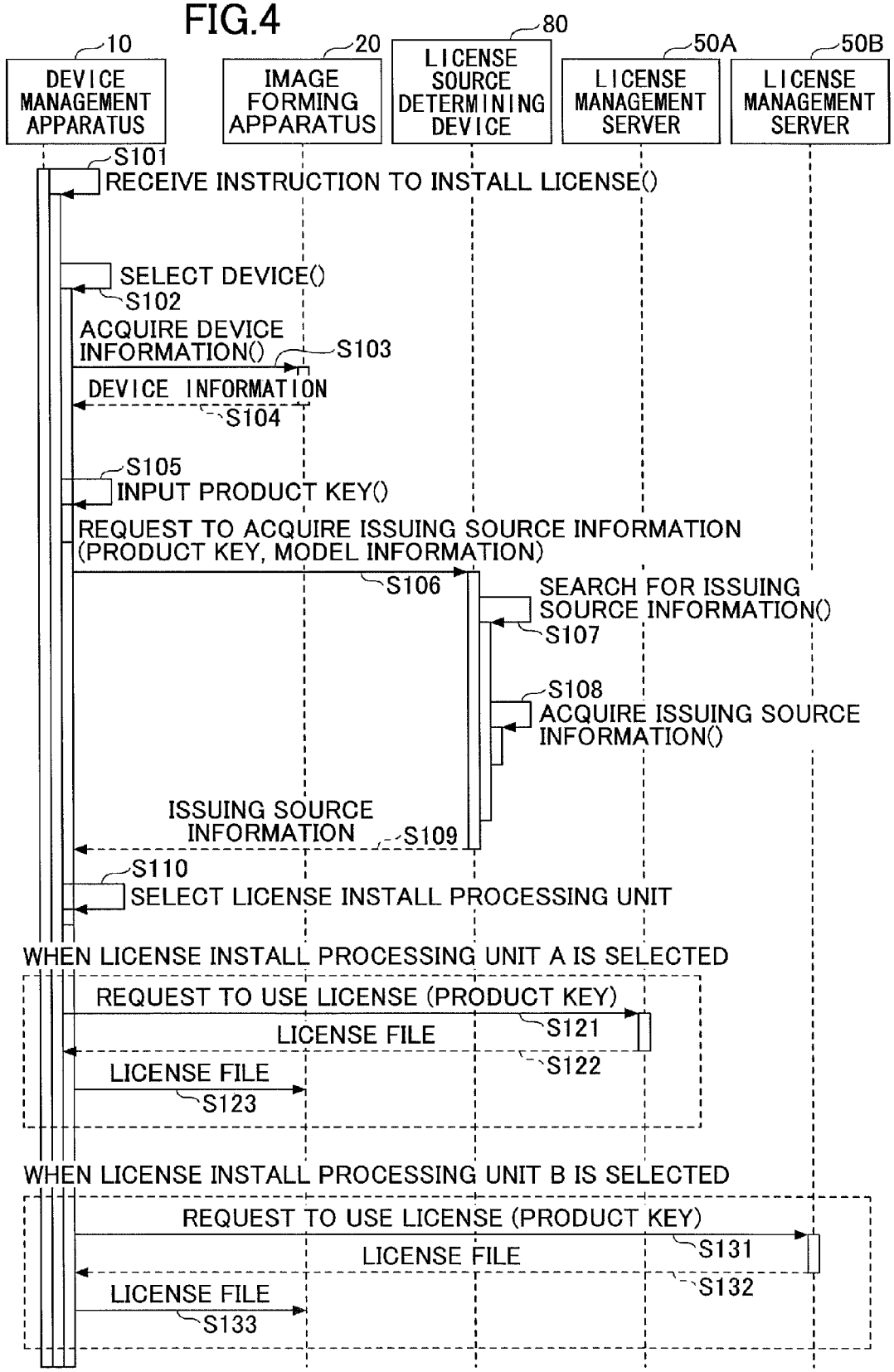
FIG. 4 is a sequence diagram for describing an example of processing procedures for installing a license according to the first embodiment.

In the following, a description is given of processing procedures of the license install support system 1 according to the first embodiment. FIG. 4 is a sequence diagram for describing an example of processing procedures for installing a license according to the first embodiment. In FIG. 4, it is assumed that the user of the image forming apparatus 20 has purchased a license of a component and has obtained the product key relevant to the license. However, it is assumed that the license file relevant to the license has not yet been installed in the image forming apparatus 20.

The request receiving unit 111 of the device management apparatus 10 receives, from the user, input of an instruction to start installing the license via an initial screen image displayed on the display device 106 (step S101). Next, the request receiving unit 111 causes the display device 106 to display a device selection screen image including a list of the image forming apparatuses 20, and prompts the user to select the image forming apparatus 20 that is to be the install destination of the license file (step S102). The user may select plural image forming apparatuses 20 in the device selection screen image. The device selection screen image displays the image forming apparatuses 20 whose IP addresses and host names are stored in the secondary storage device 102 in advance. Alternatively, the request receiving unit 111 may issue a broadcast in the network 30 to automatically search for the image forming apparatuses 20 that are connected to the network 30, and cause the host names of the image forming apparatuses 20 found as a result of the search to be displayed in the device selection screen image.

Next, the device information acquiring unit 112 sends a request to acquire device information to the respective image forming apparatuses 20 that have been selected in the device selection screen image (step S103). The image forming apparatuses 20 that have received the request to acquire device information return device information including list information of components installed in themselves as well as the machine number and model information of themselves (step S104). The machine number is identification information for identifying the machines corresponding to the respective image forming apparatuses 20. A unique machine number may be given to each of the machines corresponding to the respective image forming apparatuses 20. Furthermore, the list information of components is, for example, a list of identifiers of components (hereinafter, "component IDs").

Next, the request receiving unit 111 causes the display device 106 to display a product key input screen image, and receives user input of a product key via the product key input screen image (step S105).

Next, the issuing source information acquiring unit 113 specifies the input product key and the model information included in the device information acquired at step S104, and sends a request to acquire issuing source information to the license source determining device 80 (step S106). That is to say, the issuing source information acquiring unit 113 asks the license source determining device 80 about the appropriate license issuing source of the license file relevant to the product key (i.e., the location from where the license file is to be acquired), when the image forming apparatus 20 relevant to the model indicated by the model information is to be the install destination.

Next, the issuing source information providing unit 81 of the license source determining device 80 searches for the issuing source information corresponding to the product key and the model information, in the issuing source information storing unit 82 (step S107).

FIG. 5 illustrates a configuration example of the issuing source information storing unit 82. As shown in FIG. 5, the issuing source information storing unit 82 stores issuing source information (an issuing-source-use product key and an issuing source URL) for each of the combinations of the input product keys and model information.

The input product key and model information are cross-checked with the product key and model information specified in the request to acquire issuing source information. The model information is included in the information used for identifying the issuing source information, for the purpose of addressing a case where the issuing source of the license is different according to the model, even for the same product key. Therefore, when such a case does not apply to the system environment, the model information may be excluded.

The issuing-source-use product key is the product key that manages a license at the issuing source of the license corresponding to the combination of the input product key and the model information. For example, the license management servers 50 may have different number systems for product keys. Furthermore, the issuing source of a license of a component may be different according to the model of the image forming apparatus 20 that is the install destination of the license (usage destination), even for the same component. Meanwhile, there are cases where a license relevant to a product key that is already issued in the market, is not used in any of the models of the image forming apparatus 20 (none of the models have received the issuance of the license). That is to say, there are cases where the process of FIG. 4 has not been executed on such a product key.

In such a situation, when a product key that is already issued in the market is input by the user, but the issuing source of the license corresponding to this product key is a license management server 50 that cannot interpret (does not manage) this product key, the following problem arises. That is, this license management server 50 cannot issue a license corresponding to the input product key. This means that the user cannot use a license based on the product key that has been purchased. For this reason, an issuing-source-use product key corresponding to the issuing source of the license is stored in association with a product key (input product key) that is likely to be already issued in the market.

When the license management server 50 is capable of interpreting the product key that is already issued in the market, the same value as that of the input product key is registered in the issuing-source-use product key. Examples are the records in the first, fourth, and seventh lines in FIG. 5.

The issuing source URL is a URL (Uniform Resource Locator) of the license management server 50 that is the issuing source of the license. The issuing source URL is an example of issuing source identification information in the present embodiment. The issuing source identification information does not necessarily need to be a URL. The issuing source identification information may be any kind of information as long as the license management server 50 can be identified according to the communication protocol used by the license management server 50 that is the issuing source of the license.

In step S107, the issuing source information storing unit 82 searches for a record including an input product key and model information that match the product key and model information specified in the request to acquire issuing source information.

Next, the issuing source information providing unit 81 acquires, from the issuing source information storing unit 82, the issuing-source-use product key and the issuing source URL of the record found as a result of the search (step S108). Next, the issuing source information providing unit 81 returns, to the device management apparatus 10, the issuing source information including the issuing-source-use product key and the issuing source URL (step S109).

Next, the selecting unit 114 selects the license install processing unit 12 to which the process of installing the license is to be delegated, based on the received issuing source URL and the selection information storage unit 115 (step S110).

FIG. 6 illustrates a configuration example of the selection information storage unit 115. In FIG. 6, the selection information storage unit 115 stores association information indicating the association between the issuing source URLs (i.e., the identification information of the issuing sources of the licenses) and the license install processing units 12. That is to say, the selection information storage unit 115 stores identification information of the license install processing unit 12 for each issuing source URL. For example, the identification information of the license install processing unit 12 is a program file name of a program for causing the device management apparatus 10 to function as the license install processing unit 12. In consideration of increases and decreases in the number of license issuing sources, such a program is preferably a program that can be dynamically linked (for example, DLL (Dynamic Link Library)). Accordingly, when the number of license management servers 50 increases, it is possible to add a program relevant to the license install processing unit 12 corresponding to the new license management server 50, without changing the source code of existing parts.

In step S110, the selecting unit 114 selects the license install processing unit 12 associated with the received issuing source URL, and instructs the selected license install processing unit 12 to execute a process upon specifying the device information, the issuing source URL, and the issuing-source-use product key.

Next, the license install processing unit 12 that is instructed to execute a process executes the process of installing the license in the image forming apparatus 20 by performing processing procedures installed in itself (i.e., processing procedures relevant to the license managing method corresponding to itself).

For example, when the license install processing unit 12A is selected, the license install processing unit 12A specifies the issuing-source-use product key, and sends a request to use the license to the license management server 50A (step S121). The license management server 50A generates a license file indicating the license relevant to the product key, and returns the license file (step S122). The license install processing unit 12A sends the returned license file to the image forming apparatus 20 (step S123). Accordingly, the user can use a component that is licensed by the license relevant to the license file in the image forming apparatus 20, within the scope (for example, a time frame) of the license.

For example, when the license install processing unit 12B is selected, the license install processing unit 12B specifies the issuing-source-use product key, and sends a request to use the license to the license management server 50B (step S131). The license management server 50B generates a license file indicating the license relevant to the product key, and returns the license file (step S132). The license install processing unit 12B sends the returned license file to the image forming apparatus 20 (step S133). Accordingly, the user can use a component that is licensed by the license relevant to the license file in the image forming apparatus 20, within the scope (for example, a time frame) of the license.

As a matter of convenience, FIG. 4 does not show the process when the license install processing unit 12C is selected. When the license install processing unit 12C is selected, the same steps as those of steps S121 through S123 or steps S131 through S133 are to be performed with the use of the license management server 50C.

As described above, according to the first embodiment, the issuing source of the license is automatically determined based on the product key input by the user, and the license file is acquired from the issuing source. Thus, the user does not need to consider the issuing source of the license. Specifically, there is no need to use different applications on the client side depending on the issuing source of the license. Therefore, according to the first embodiment, even when there are plural issuing sources of licenses, the workload of installing licenses can be appropriately mitigated.

The device management apparatus 10 may have the functions of the license source determining device 80. Specifically, the device management apparatus 10 may include the issuing source information providing unit 81 and the issuing source information storing unit 82.

Incidentally, the processing procedures executed by the respective license install processing units 12 are not necessarily the same. The steps S121 through S123 and steps S131 through S133 indicated in FIG. 4 are merely brief summaries of the processing procedures. That is to say, the respective steps indicate the basic flows of information or data implemented by the processes performed by the corresponding license install processing units 12. Thus, only abstract descriptions are given above with regard to steps S121 through S123 and steps S131 through S133. As an example, the following describes a specific embodiment of a license management method performed by the license management server 50A.

Figure 7:
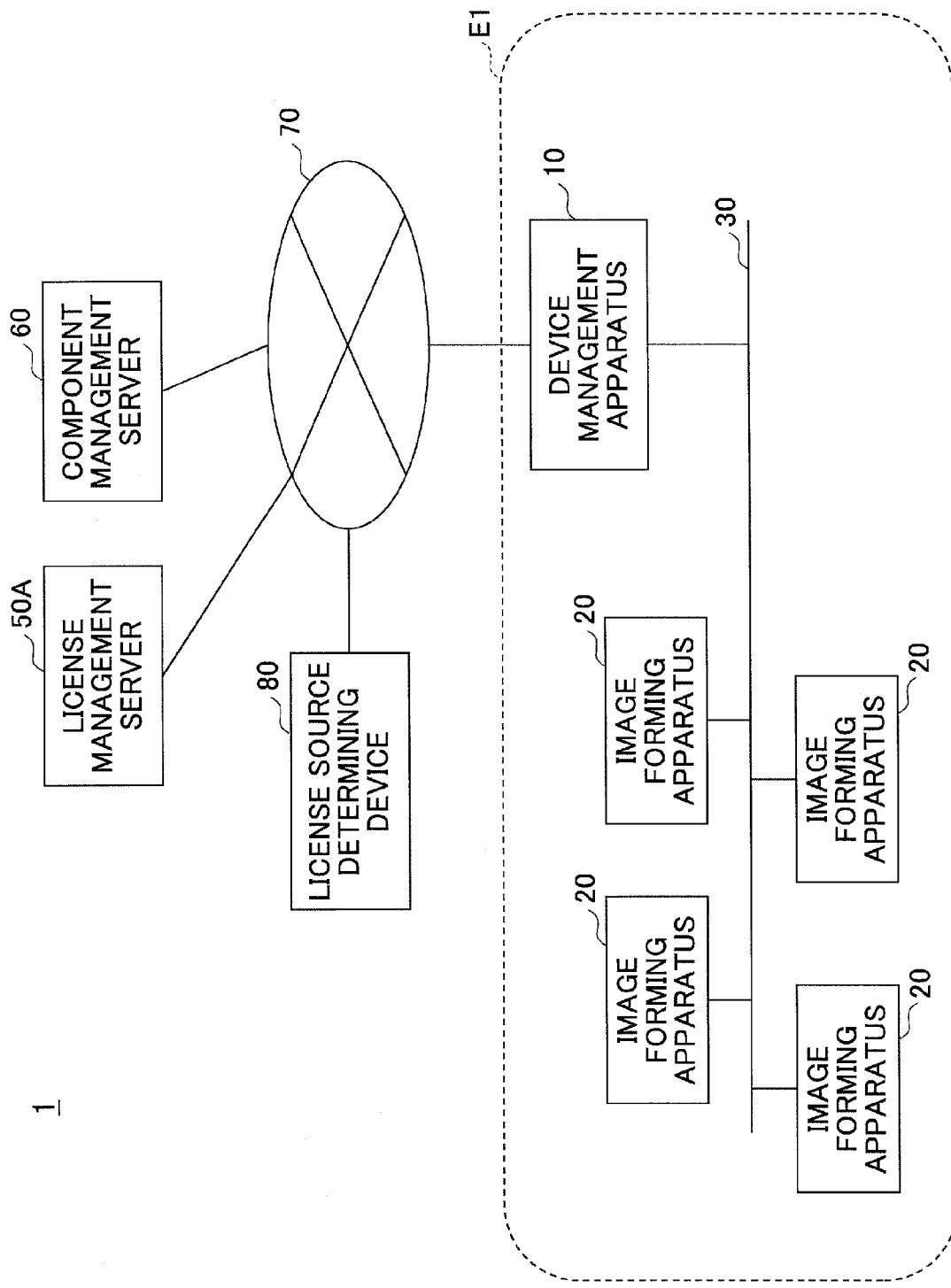
FIG. 7 illustrates a system configuration example of a license install support system according to a second embodiment.

FIG. 7 illustrates a system configuration of a license install support system according to a second embodiment. In FIG. 7, elements corresponding to those in FIG. 1 are denoted by the same reference numerals and are not further described.

In FIG. 7, a component management server 60 is connected to the network 70. The component management server 60 is a computer for managing the entity of a component whose license is managed by the license management server 50A. In the second embodiment, when a license is installed in the image forming apparatus 20, the license install processing unit 12A downloads a component from the component management server 60 and installs the component in the image forming apparatus 20. For this reason, in the second embodiment, the component management server 60 corresponding to the license management server 50A is provided.

In FIG. 7, the license management server 50B and the license management server 50C are not shown as a matter of convenience.

Figure 8:
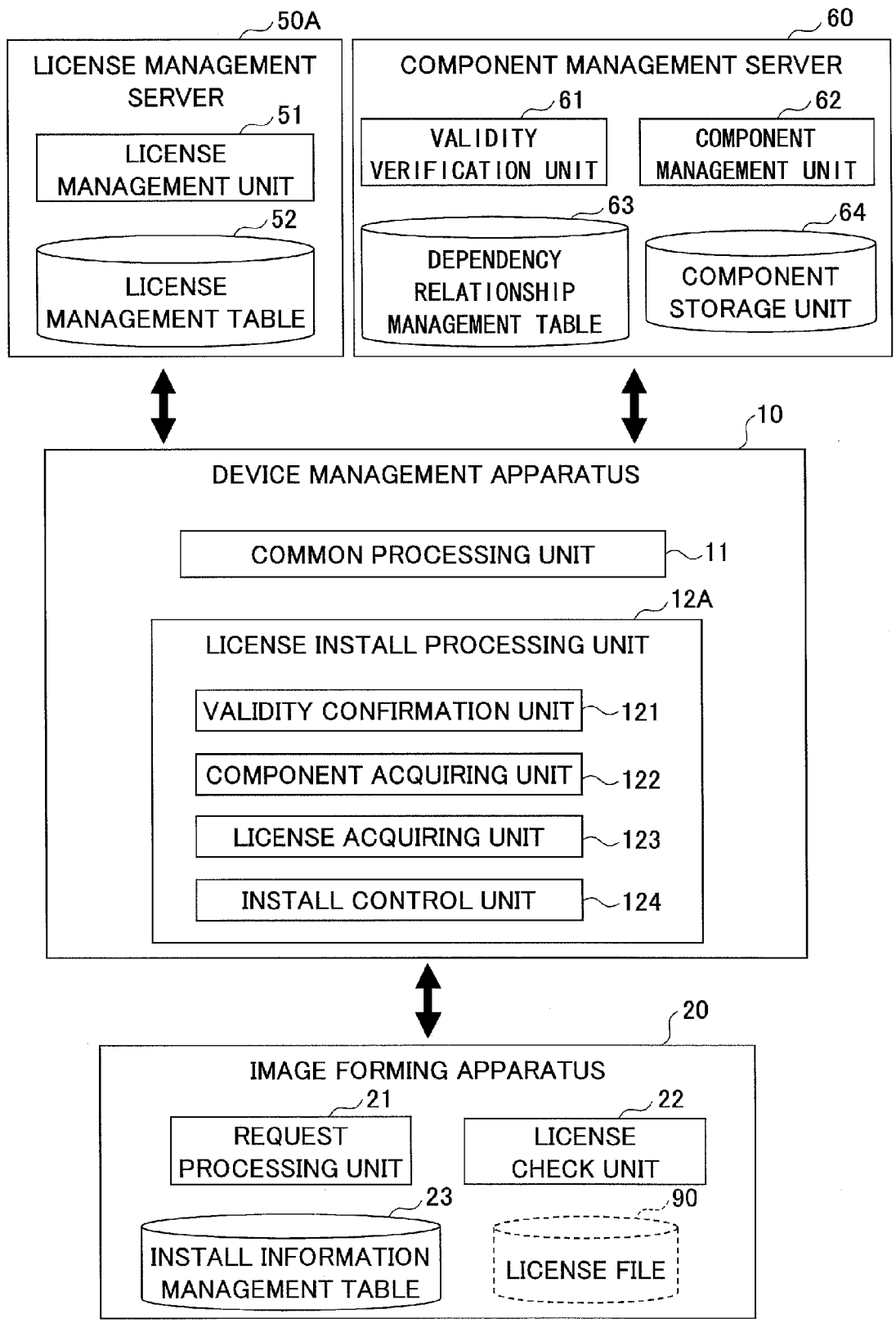
FIG. 8 illustrates an example of a function configuration of the license install support system according to the second embodiment.

FIG. 8 illustrates an example of a function configuration of the license install support system 1 according to the second embodiment. In FIG. 8, elements corresponding to those in FIG. 3 are denoted by the same reference numerals and are not further described.

As shown in FIG. 8, the image forming apparatus 20 includes a request processing unit 21, a license check unit 22, and an install information management table 23. In response to a request from the device management apparatus 10, the request processing unit 21 transmits device information and installs a component and a license file 90.

The license file 90 is a license file issued by the license management server 50A. The license check unit 22 determines whether a component is allowed to be used in the image forming apparatus 20, based on the license file 90. The install information management table 23 is a table for managing information relevant to components installed in the image forming apparatus 20, etc., and is stored in a storage device of the image forming apparatus 20.

The license management server 50A includes a license management unit 51 and a license management table 52. The license management unit 51 issues a license relevant to a components (i.e., generates a file of a license). The license management table 52 is a table for recording the usage status of a license of a component, and is stored in a storage device of the license management server 50A.

The component management server 60 includes a validity verification unit 61, a component management unit 62, a dependency relationship management table 63, and a component storage unit 64.

The validity verification unit 61 refers to the dependency relationship management table 63 to determine whether the dependency relationship relevant to the component that is the install target is satisfied by a component that is already installed in the image forming apparatus 20 that is the install destination. Specifically, the validity verification unit 61 determines whether a component that is dependent upon by the component that is the install target, is already installed in the image forming apparatus 20.

The component management unit 62 manages the entity (for example, a file) of a component recorded in the component storage unit 64. For example, in response to receiving a request to download a component, the component management unit 62 acquires the component from the component storage unit 64, and returns the acquired component to the request source.

The dependency relationship management table 63 is a table recording information indicating the dependency relationship between components, and is stored in a storage unit of the component management server 60. The component storage unit 64 is a storage area for storing an entity of a component in association with a component ID, in the storage device of the component management server 60.

In the device management apparatus 10, detailed elements relevant to the license install processing unit 12A are shown. In FIG. 8, the license install processing unit 12A includes a validity confirmation unit 121, a component acquiring unit 122, a license acquiring unit 123, and an install control unit 124.

The validity confirmation unit 121 causes the component management server 60 to verify the validity of installing a component that is the install target in the image forming apparatus 20 that is the install destination.

The component acquiring unit 122 downloads (acquires) the component that is the install target from the component management server 60. The license acquiring unit 123 acquires the license file 90 relevant to the component that is the install target, from the license management server 50A. The install control unit 124 sends the component and the license file 90 to the image forming apparatus 20.

In the following, a description is given of processing procedures performed by the license install support system 1 according to the second embodiment. In the second embodiment, details are given of the processing procedures corresponding to steps S121 through S123 which are described in a simplified manner in FIG. 4 (i.e., processing procedures executed by the license install processing unit 12A after step S110). Steps S101 through S110 illustrated in FIG. 4 are executed in the second embodiment also, but are not further described.

Figure 9:
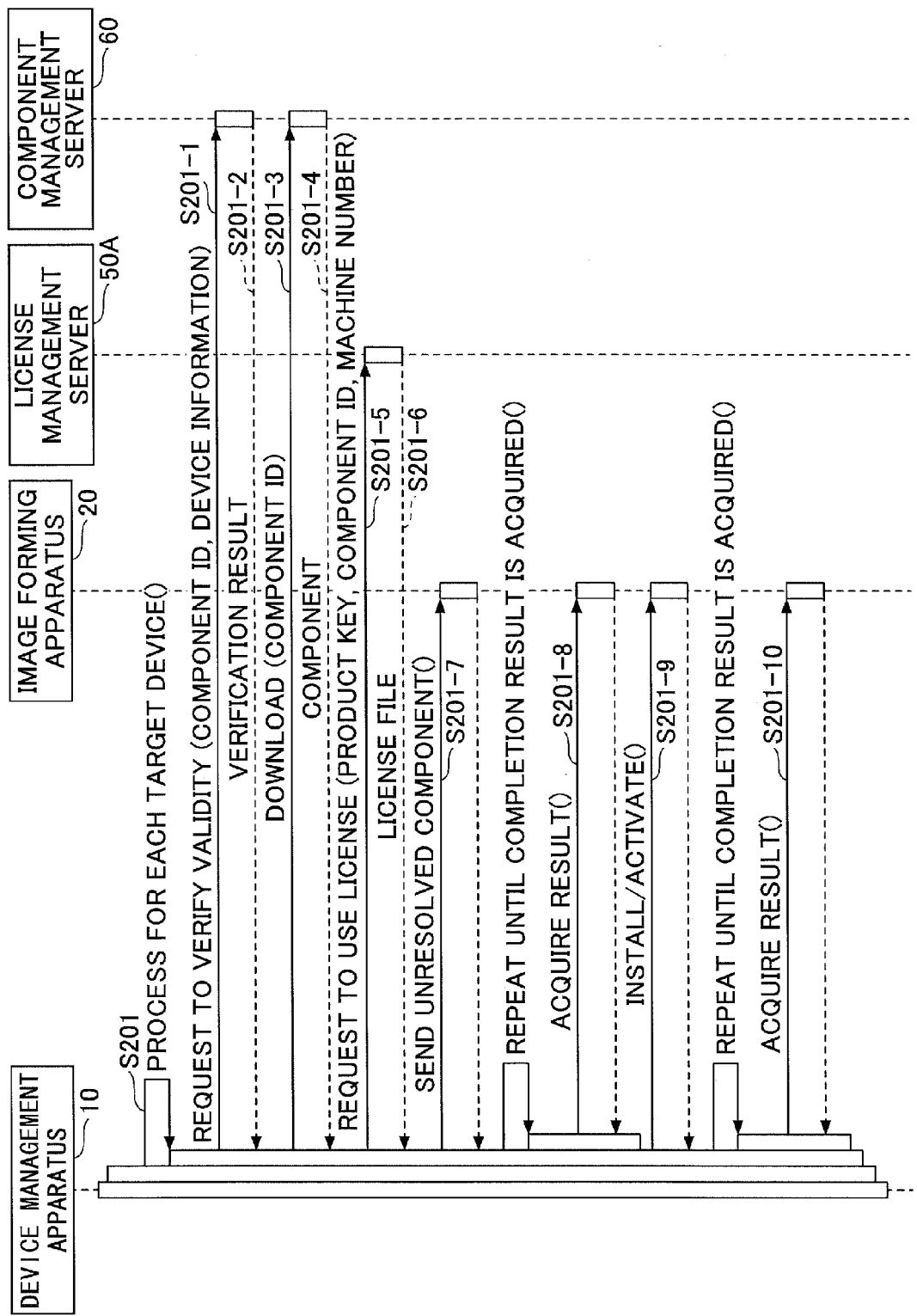
FIG. 9 is a sequence diagram for describing an example of processing procedures for installing a license according to the second embodiment.

FIG. 9 is a sequence diagram for describing an example of processing procedures for installing a license according to the second embodiment.

Step S201 is a loop process executed for each image forming apparatus 20 from which device information has been acquired (for each image forming apparatuses 20 selected in the device selection screen image). The image forming apparatus 20 that is the processing target of the loop process is hereinafter referred to as a "current device".

In step S201-1, the validity confirmation unit 121 sends a request to verify the validity to the component management server 60. The request includes the component ID of the component relevant to the license that is the install target (hereinafter, "current component") and the device information of the current device. In this example, the "validity" means the validity of installing the current component in the current device. The validity verification unit 61 of the component management server 60 refers to the dependency relationship management table 63 to verify the validity, in response to receiving the validity verification request.

FIG. 10 illustrates a configuration example of the dependency relationship management table 63. As shown in FIG. 10, the dependency relationship management table 63 has information registered for each component. The information includes a component ID of the corresponding component and a component ID of a component upon which the corresponding component depends (the dependency destination of the corresponding component, hereinafter, also referred to as a "dependency destination component"). Plural component IDs of dependency destination components may be registered. In FIG. 10, "0" indicates that there is no dependency destination component.

In the process of verifying the validity, the validity verification unit 61 identifies the dependency destination component of the current component based on the component ID of the current component and the dependency relationship management table 63. When there is a dependency destination component, the validity verification unit 61 determines whether the component ID of the dependency destination component is included in the device information. When component IDs of all dependency destination components are included in the device information, the validity verification unit 61 determines that the verification result is valid. When there is at least one dependency destination component that is not included in the device information (hereinafter, "unresolved component"), the validity verification unit 61 determines that the verification result is invalid. There may be plural dependency destination components for a single component. Furthermore, the process of searching for the dependency relationship is performed recursively.

Next, the validity verification unit 61 returns the result of verifying validity to the validity confirmation unit 121 (step S201-2). When the validity verification unit 61 has determined that the install process is invalid, the verification result includes the component ID of the unresolved component.

Next, the component acquiring unit 122 specifies the component ID of the current component, and sends a download request to the component management server 60 (step S201-3). The component management unit 62 of the component management server 60 acquires a component corresponding to the specified component ID from the component storage unit 64, and returns the acquired component to the component acquiring unit 122 (step S201-4). Furthermore, when a verification result indicating invalid is received at step S201-2, the unresolved component is also downloaded.

Next, the license acquiring unit 123 specifies the product key (issuing-source-use product key) acquired at step S109 of FIG. 4, the component ID of the current component, and the machine number of the current device, and sends a request to use a license (a request to acquire the license file 90) to the license management server 50A (step S201-5).

The license management unit 51 of the license management server 50A generates the license file 90 based on the information included in the request to use the license as well as the license management table 52, and returns the generated license file 90 to the license acquiring unit 123 (step S201-6).

FIG. 11 illustrates a configuration example of the license file 90. As shown in FIG. 11, the license file 90 includes a component ID, a machine number, and an expiration date. The component ID in the license file 90 is the component ID of the component for which a license is granted (usage is allowed) by the license file 90. The machine number in the license file 90 is the machine number of the image forming apparatus 20 in which usage of the component relevant to the component ID is allowed by the license file 90. The expiration date is the expiration date of the license file 90, i.e., the expiration date of the license that is granted by the license file 90.

The component ID relevant to the product key included in the request to use the license is registered as the component ID in the license file 90. The machine number included in the request to use the license is registered as the machine number in the license file 90. A date (for example, year, month, and date) obtained by adding, to the present time point, the effective period registered in the license management table 52 for the product key and component ID included in the license usage request, is registered as the expiration date in the license file 90.

FIG. 12 illustrates a configuration example of the license management table 52. As shown in FIG. 12, the license management table 52 includes, for each license issued for a component, a management number, a product key, a component ID, a machine number, a status, a license format, a license effective period, a license expiration date, and a license issue date.

Among these items, the management number, the product key, the component ID, the status, the license format, and the license effective period are recorded in the license management table 52 when the license is purchased. Specifically, the component ID, the license format, and the license effective period are specified by the user when the license is purchased.

A license format is information indicating whether a license of a component is an unlimited license, a time-limited license, or a trial license. An unlimited license is a license that can be used indefinitely after being purchased. A time-limited license is a license that is effective (that can be used) only within a predetermined period. A trial license is a license to be used as a trial. The license effective period is the period during which the license is effective. This attribute is effective when the license format is a time-limited license or a trial license.

Meanwhile, the machine number, the license expiration date, and the license issue date are recorded when the license is issued (i.e., when the license file 90 is issued). Furthermore, when the license is issued, the value of the status is updated.

The management number is an identifier (number) that is assigned to each record when a record is generated in the license management table 52. The product key and the component ID are as described above.

As to the machine number, every time a license file 90 is issued, the machine number of the image forming apparatus 20 specified as the device in which the component is to be used, is registered. The status is information indicating the usage status of a license. In the present embodiment, the usage statuses of a license are "no license", "check out", and "check in". Check out is a status where the license is being used. Check in is a status where the license is released (i.e., the license is available to be used). The license expiration date of a license (license file 90) is calculated based on the license effective period, when the license file 90 is issued. The license issue date is the date when a license (license file 90) is issued, which is registered when the license file 90 is issued.

In FIG. 12, the records of management numbers 1 through 3 have the same product key and component ID. This indicates that the article of the product key "KEY001" is relevant to a volume license corresponding to three licenses. A volume license is for allowing a single component to be used in plural image forming apparatuses 20, corresponding to the number of image forming apparatuses 20 specified in the volume license.

The license acquiring unit 123 executes step S201-5 when the operation of acquiring (downloading) a component performed by the component acquiring unit 122 is successful. That is, when the component is not successfully acquired, the license acquiring unit 123 does not acquire the license file 90. When a component cannot be acquired, the component cannot be installed. If the license file 90 corresponding to such a component is acquired, usage of a license is started for a component that is not actually used. This is disadvantageous for the user.

Next, when an unresolved component is acquired at step S201-4, the install control unit 124 sends the unresolved component to the current device, and requests the current device to install the unresolved component (step S201-7). The request processing unit 21 of the current device installs the unresolved component, and records information relevant to the unresolved component (component ID, etc.) in the install information management table 23.

FIG. 13 illustrates a configuration example of the install information management table 23. As shown in FIG. 13, the install information management table 23 has a component ID, a version, an activation flag, and a license expiration date registered for each of the components installed in the image forming apparatus 20.

The version is the version of the component. The activation flag indicates whether the component is activated. Activated means that the license has been installed and the component can be used. The license expiration date is the expiration date of a license (license file 90) that has been installed for the component.

Next, the install control unit 124 inquires the current device about the install result of the unresolved component (step S201-8). The inquiry (polling) is repeated until the install process is completed at the current device and an install completion result is returned.

The unresolved component is installed first, in order to avoid a situation where a failure is caused when installing a component because the dependency destination component of the component is not yet installed.

Next, the install control unit 124 sends, to the current device, the component (current component) acquired at step S201-4 and the license file 90 acquired in step S204-6, and requests the current device to install and activate the component (step S201-9). The request processing unit 21 of the current device installs the component and records the information of the component (component ID, etc.) in the install information management table 23. Furthermore, the request processing unit 21 records the license file 90 in a predetermined storage area.

Next, the install control unit 124 inquires the current device about the install result of the component (step S201-10). The inquiry (polling) is repeated until the install process is completed at the current device and an install completion result is returned.

Next, a description is given of details of the process executed by the license management unit 51 of the license management server 50A, in response to the request to use the license of step S201-5 in FIG. 9.

Figure 14:
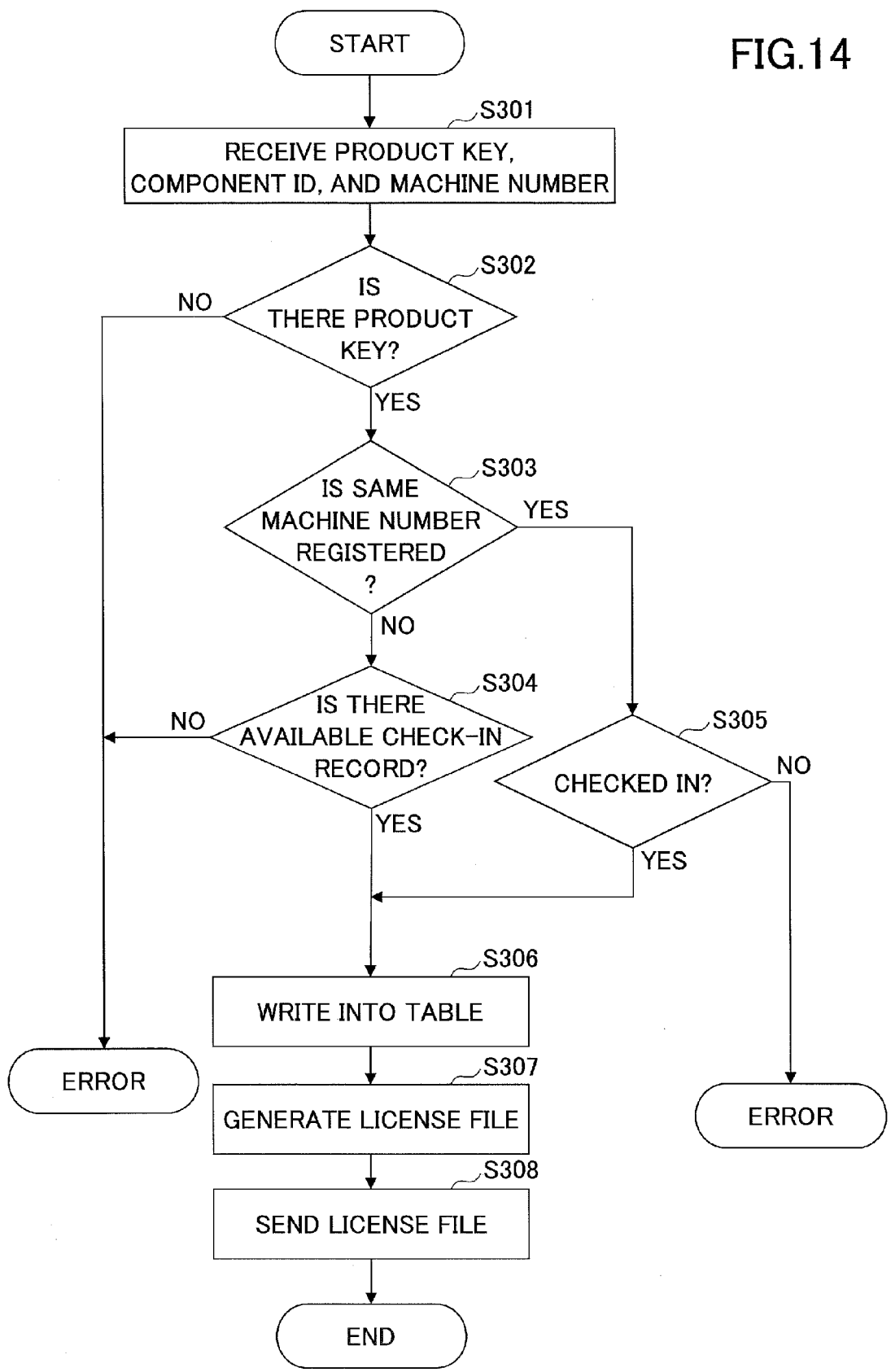
FIG. 14 is a flowchart for describing processing procedures of a process of generating a license file performed by a license management unit.

FIG. 14 is a flowchart for describing processing procedures of the process of generating a license file 90 performed by the license management unit 51. In FIG. 14, a single product key is the processing target. Therefore, when plural product keys are received, steps S302 and onward are executed for each of the product keys.

In step S301 (step S201-5 of FIG. 9), the license management unit 51 receives, from the install control unit 124, a license usage request including a product key, a component ID, and a machine number. Then, the license management unit 51 determines whether usage of the license relevant to the product key is allowed. Specifically, the license management unit 51 confirms whether the received product key is registered in the license management table 52 (step S302). When the product key is registered (YES in step S302), the license management unit 51 confirms whether the same machine number as the received machine number is registered in the license management table 52 for the product key (step S303). When the same machine number is not registered (NO in step S303), the license management unit 51 confirms whether the license management table 52 has a record in which the status is "check in", among the records relevant to the product key and the received component ID (step S304). When there is a corresponding record (YES in step S304), the license management unit 51 records the received machine number in the record, and changes the status of the record to "check out" (step S306). That is to say, it is recorded that the license corresponding to the product key is being used. Furthermore, when a license effective period is recorded in the record (i.e., when the record corresponds to a time-limited license), the license management unit 51 records, in the record, a date obtained by adding the license effective period to the present date, as the license expiration date.

Next, the license management unit 51 generates the license file 90 (see FIG. 11) including the component ID, the machine number, and the expiration date in the record (step S307). The license file 90 is generated for each record in the license management table 52, i.e., for each license corresponding to a component. Next, the license management unit 51 returns the generated license file 90 to the install control unit 124 of the device management apparatus 10 (step S308).

Meanwhile, when there is a record in which the same machine number as the received machine number is recorded for the product key (YES in step S303), the license management unit 51 confirms whether the status of the record is "check in" (step S305). When the status is "check in" (YES in step S305), steps S306 and onward are executed.

When the license management table 52 does not have a record relevant to the product key (NO in step S302), or when the license management table 52 does not have a record whose status is "check in" among the records relevant to the product key and the received component ID (NO in step S304), or when the record in which the same machine number as the received machine number is registered for the product key is indicating a status other than "check in" (NO in step S305), the license management unit 51 determines that an error is detected and does not generate the license file 90, i.e., does not issue a license.

In the image forming apparatus 20, the license file 90 is used for the license check performed by the license check unit 22 that is executed when the installed component is activated. That is to say, the license check unit 22 allows the component to be activated when the following conditions are satisfied. Specifically, the conditions are that there is a license file 90 corresponding to a component to which the component that is the activation target belongs, the machine number indicated in the license file 90 is the same as the machine number of the image forming apparatus 20 in which the component is to be activated, and the expiration date of the license file 90 has not yet passed. Otherwise, the license check unit 22 does not allow the component to be activated.

The second embodiment indicates an example of processing procedures based on the license management method performed by the license management server 50A. Therefore, when another license management server 50 is the license issuing source, different processing procedures may be executed. For example, in the second embodiment, the component is automatically installed together with the license being installed. However, in another example, a separate process may need to be executed for installing the component. Thus, the function configuration of the image forming apparatus 20 may be different depending on the license issuing source.

However, as a common feature to all license issuing sources, the usage statuses of licenses may be managed with the use of a storage unit such as the license management table 52. This feature is for preventing a component from being used beyond the scope of the purchased license.

In consideration of such a situation, if the first embodiment is implemented without any modification, there may be a case where a component is used beyond the scope of a license. Specifically, in the issuing source information storing unit 82 of FIG. 5, issuing source information relevant to the same input product key "1111111111" is recorded in the first and second rows. The model information in the first row is "A" and the model information in the second row is "B". The issuing URL of the first row is the URL relevant to the license management server 50A, and the issuing URL of the second row is the URL relevant to the license management server 50B. Thus, the issuing source of the license relevant to the input product key may differ depending on the model of the image forming apparatus 20 that is the install destination of the license. It is assumed that the number of licenses (volume number) relevant to the product key is "1".

Under the above circumstances, it is assumed that a license relevant to the product key "1111111111" is installed in the image forming apparatus 20 of model B. As a result, in the license management server 50B, it is recorded that the license relevant to the product key is being used. The number of licenses corresponding to the license is "1", and therefore no more than one license based on this product key is allowed to be installed.

However, in the license management table 52 of the license management server 50A, the status of the license is "check in". Thus, assuming that a process of installing the license relevant to the product key in the image forming apparatus 20 of model A is performed, the license is installed in the image forming apparatus 20, although it is not supposed to be installed.

In order to prevent such a situation, every time the a license is issued, the respective license management servers 50 may report to each other the product key of the issued license.

Specifically, the license management server 50 that has received a license usage request inquires the license source determining device 80 about the issuing source information relevant to the product key specified in the usage request. The license management server 50 specifies the issuing-source-use product key included in the issuing source information and reports that the license has been issued, to another license management server 50 relevant to the issuing source information returned from the license source determining device 80. The license management server 50 that has received the report sets the status of the license (corresponding to one license) relevant to the issuing-source-use product key specified in the report, to be in a used status. Accordingly, the usage status of the license can be synchronized among the respective license management servers 50. Consequently, it is possible to prevent a situation where a component is used beyond the scope of the license.

Furthermore, when the respective license management servers 50 are administered by different administration entities, it may be difficult to establish a mechanism for exchanging information between the respective license management servers 50. In consideration of such a case, the following processing procedures may be executed.

In step S109 of FIG. 4, the issuing source information providing unit 81 of the license source determining device 80 returns all issuing source information items relevant to the product key specified in the request to acquire issuing source information (step S106). That is to say, as to the issuing source information to be returned, there is no limit based on the model information.

In the device management apparatus 10 that has received the issuing source information, the selecting unit 114 instructs execution to the respective license install processing units 12 corresponding to the issuing source information items. That is to say, the target of execution instruction is not limited to a single license install processing unit 12. Thus, plural license install processing units 12 perform the process of installing licenses in parallel. However, the install destination of the license is the particular image forming apparatus 20 that is selected in step S102 of FIG. 4. Accordingly, when the model of the image forming apparatus 20 is A, the image forming apparatus 20 can perform communications with the license install processing unit 12A, but not with license install processing units 12 other than the license install processing unit 12A. Thus, the license is successfully installed only in the license install processing unit 12A. Meanwhile, the other license install processing units 12 have already received issuance of the license from the corresponding license management servers 50. Therefore, it is recorded in the respective license management servers 50 that the license relevant to the same product key is in a used status. Consequently, the usage status of the license can be essentially synchronized among the respective license management servers 50.

According to an aspect of the present invention, a license install support system and a license install support method are provided, which are capable of appropriately mitigating the workload of installing licenses, even when there are plural license issuing sources.

The present invention is not limited to the specific embodiments described herein, and variations and modifications may be made without departing from the scope of the present invention.

The invention claimed is:

1. A license source determining device comprising:
   an issuing source information storage device configured to store association information that contains issuing source information including issuing source identification information of license data for each piece of license identification information of the license data used by an electronic device for determining whether activation of a first program is allowable; and
   at least one processor that executes a second program configured to implement an issuing source information providing unit configured to acquire the issuing source information corresponding to a first piece of the license identification information specified in an acquisition request in response to the acquisition request of the issuing source information from a license install support device connected via a network by using the issuing source information storage device, and to return the issuing source information to the license install support device.

2. The license source determining device according to claim 1, wherein the at least one processor that executes the second program is configured to further implement:
   a receiving unit configured to receive input of the first piece of license identification information used for receiving the license data used by the electronic device for determining whether the activation of the first program is allowable; and
   a license install processing unit configured to acquire the license data corresponding to the first piece of the license identification information from a first license management device associated with the issuing source information among a plurality of license management devices connected via the network, and to send the license data to the electronic device.

3. The license source determining device according to claim 2, wherein
   the issuing source information includes a second piece of license identification information corresponding to the first license management device relevant to the issuing source identification information included in the issuing source information, and
   the license install processing unit acquires the license data corresponding to the second piece of license identification information from the first license management device.

4. The license source determining device according to claim 1, further comprising:
   a selection information memory device configured to store association information indicating association between plural sets of the issuing source information and the plurality of the license install processing units, wherein the at least one processor that executes the second program is configured to further implement:
   a plurality of the license install processing units each corresponding to one of the plurality of license management devices, and
   a selecting unit configured to select, with the use of the selection information memory device, the license install processing unit corresponding to the issuing source information received by the issuing source information acquiring unit, wherein
   the license install processing unit selected by the selecting unit acquires the license data from the license management device associated to the selected license install processing unit, and sends the license data to the electronic device.

5. A license source determining system comprising:
   an electronic device for determining whether activation of a program is allowable;
   an issuing source information storing unit configured to store association information relevant to issuing source information including issuing source identification information of license data for each piece of license identification information of the license data used by the electronic device for determining whether the activation of the program is allowable; and
   an issuing source information providing unit configured to acquire the issuing source information corresponding to a first piece of the license identification information specified in an acquisition request in response to the acquisition request of the issuing source information from a license install support device connected via a network by using the issuing source information storing unit, and to return the issuing source information to the license install support device.

6. The license source determining system according to claim 5, further comprising:
   a receiving unit configured to receive input of the first piece of license identification information used for receiving the license data used by the electronic device for determining whether the activation of the program is allowable; and
   a license install processing unit configured to acquire the license data corresponding to the first piece of the license identification information from a first license management device associated with the issuing source information among a plurality of license management devices connected via the network, and to send the license data to the electronic device.

7. The license source determining device according to claim 6, wherein
   the issuing source information includes a second piece of license identification information corresponding to the first license management device relevant to the issuing source identification information included in the issuing source information, and the license install processing unit acquires the license data corresponding to the second piece of license identification information from the first license management device.

8. The license source determining system according to claim 5, further comprising:
- a plurality of the license install processing units each corresponding to one of the plural license management devices,
- a selection information storing unit configured to store association information indicating association between plural sets of the issuing source information and the plurality of the license install processing units, and
- a selecting unit configured to select, with the use of the selection information storing unit, the license install processing unit corresponding to the issuing source information received by the issuing source information acquiring unit, wherein
- the license install processing unit selected by the selecting unit acquires the license data from the license management device associated to the selected license install processing unit, and sends the license data to the electronic device.

9. A non-transitory computer-readable medium containing instructions that when executed by a computer cause the computer to perform steps of:
- receiving input of a first license identifier used for receiving license data, the license data being used by an electronic device for determining whether activation of a program is allowable;
- sending, to a license source determining device connected via a network, an acquisition request specifying the first license identifier for acquiring issuing source information including issuing source identification information of the license data;
- receiving the issuing source information returned from the license source determining device; and
- using a license install processing unit to acquire the license data corresponding to the first license identifier from a license management device relevant to the issuing source information included among plural license management devices connected via the network, and to send the license data to the electronic device.

10. A non-transitory computer-readable medium containing instructions that when executed by a computer cause the computer to perform steps of:
- receiving an acquisition request of issuing source information from a license install support device connected via a network;
- acquiring the issue source information corresponding to a first license identifier specified in the acquisition request by using an issuing source information storage unit and returning the issuing source information to the license install support device; and
- storing association information into the issuing source information storage unit associated with the issuing source information including issuing source identification information of license data for each license identifier of the license data used by an electronic device for determining whether activation of a program is allowable.

* * * * *